United States Patent
Agrawal et al.

(10) Patent No.: US 10,824,432 B2
(45) Date of Patent: Nov. 3, 2020

(54) SYSTEMS AND METHODS FOR PROVIDING MULTIPLE CONSOLE SESSIONS THAT ENABLE LINE-BY-LINE EXECUTION OF SCRIPTS ON A SERVER APPLICATION

(71) Applicant: ServiceNow, Inc., Santa Clara, CA (US)

(72) Inventors: Ankush Agrawal, Raipur (IN); Antesh Bharadwaj, Hyderabad (IN); Soumen Pal, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 249 days.

(21) Appl. No.: 15/967,151

(22) Filed: Apr. 30, 2018

(65) Prior Publication Data
US 2019/0332386 A1 Oct. 31, 2019

(51) Int. Cl.
*G06F 9/46* (2006.01)
*G06F 9/38* (2018.01)
*G06F 9/48* (2006.01)
*H04L 29/08* (2006.01)

(52) U.S. Cl.
CPC ............ *G06F 9/3851* (2013.01); *G06F 9/485* (2013.01); *G06F 9/4887* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,321,229 B1 | 11/2001 | Goldman | |
| 6,678,887 B1 | 1/2004 | Hallman | |
| 7,020,706 B2 | 3/2006 | Cates | |
| 7,478,151 B1 * | 1/2009 | Maiocco | H04L 43/08 709/223 |
| 8,151,261 B2 | 4/2012 | Sirota | |
| 8,204,746 B2 * | 6/2012 | Odinak | G10L 15/193 704/244 |
| 8,646,093 B2 | 2/2014 | Myers | |
| 9,065,783 B2 | 6/2015 | Ding | |
| 9,122,552 B2 | 9/2015 | Whitney | |
| 9,363,252 B2 | 6/2016 | Mueller | |
| 9,535,737 B2 | 1/2017 | Joy | |
| 9,557,969 B2 | 1/2017 | Sharma | |
| 9,609,844 B2 | 4/2017 | Mertz et al. | |
| 9,645,833 B2 | 5/2017 | Mueller | |

(Continued)

*Primary Examiner* — Van H Nguyen
(74) *Attorney, Agent, or Firm* — Fletcher Yoder PC

(57) ABSTRACT

Systems and methods are disclosed that provide multiple mutually exclusive console sessions to execute server-side scripts in parallel. In particular, a cloud-based platform receives an indication that a console session is instantiated from, a client device. The platform then generates a thread having a unique identifier. The thread corresponds to a background job performed on the platform. The platform determines whether an input queue associated with the unique identifier has an input. If so, the platform evaluates the input and writes a resulting output to an output queue associated with the unique identifier. The client device then prints the input and the resulting output to a console user interface associated with the console session, and removes the input from the input queue. In some embodiments, if the input queue stores no inputs for a threshold period of time (e.g., a timeout period), the platform ends the thread.

20 Claims, 6 Drawing Sheets

(56) References Cited

U.S. PATENT DOCUMENTS

| | | | |
|---|---|---|---|
| 9,720,674 B1* | 8/2017 | Spreha | G06F 9/4401 |
| 9,959,129 B2* | 5/2018 | Kannan | G10L 15/1822 |
| 2009/0112918 A1* | 4/2009 | Terrell | G06F 16/958 |
| 2009/0245122 A1* | 10/2009 | Maiocco | H04L 43/08 |
| | | | 370/252 |
| 2011/0191385 A1 | 8/2011 | Mayatskikh et al. | |
| 2016/0203002 A1* | 7/2016 | Kannan | G06F 3/162 |
| | | | 715/708 |

* cited by examiner

SYSTEMS AND METHODS FOR PROVIDING MULTIPLE CONSOLE SESSIONS THAT ENABLE LINE-BY-LINE EXECUTION OF SCRIPTS ON A SERVER APPLICATION

BACKGROUND

The present disclosure relates generally to executing commands on a server, and, more particularly, to executing server-side scripts using a console session on a client device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Within the context of cloud computing solutions, debugging a server application is typically performed by committing a block of computer code to, for example, a database, executing the block of code on the server application, and viewing the results of executing the block of code. As such, viewing the output of each line of computer code may include tediously committing a respective line of computer code to the database, executing the respective line of computer code on the server application, and viewing the result of executing the respective line of computer code—for each line of computer code. Moreover, executing the committed block of computer code on the server application may generally be performed only in a single instance. That is, when a first developer is executing his block of code on the server application, other developers may be prevented from executing their blocks of code on the server application until the first developer's block of code has completed execution.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes a cloud-based platform (or a server of the cloud-based platform) receiving an indication that a console session is instantiated from, for example, a client device. In response to receiving the indication, the cloud-based platform may generate a thread having a unique identifier. The thread may correspond to a background job (e.g., a job that is executed on the server-side but instructed to be executed on the client-side) performed on the cloud-based platform. The cloud-based platform may execute threads mutually exclusively (e.g., in parallel, but such that each thread has its own context). The cloud-based platform may determine whether an input queue associated with the unique identifier has an input. If so, the cloud-based platform evaluates the input and writes a resulting output to an output queue associated with the unique identifier. The client device may then print the input and the resulting output to a console user interface associated with the console session, and remove the input from the input queue. In some embodiments, if the input queue stores no inputs for a threshold period of time (e.g., a timeout period), the cloud-based platform may end the thread.

Additionally, the console user interface may enable selection of the printed inputs to have the server quickly reevaluate an input. Each console user interface may also enable usage of pre-defined scripts to quickly generate a block of code desired by a developer. In some embodiments, the console user interface may enable searching of the pre-defined scripts by identifying search terms in metadata of the pre-defined scripts. As such, the developer may use the console to conveniently generate a block of desired computer code.

In this manner, multiple developers may use multiple mutually exclusive console sessions to execute server-side scripts in parallel, instead of only allowing one developer at a time to execute server-side scripts.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
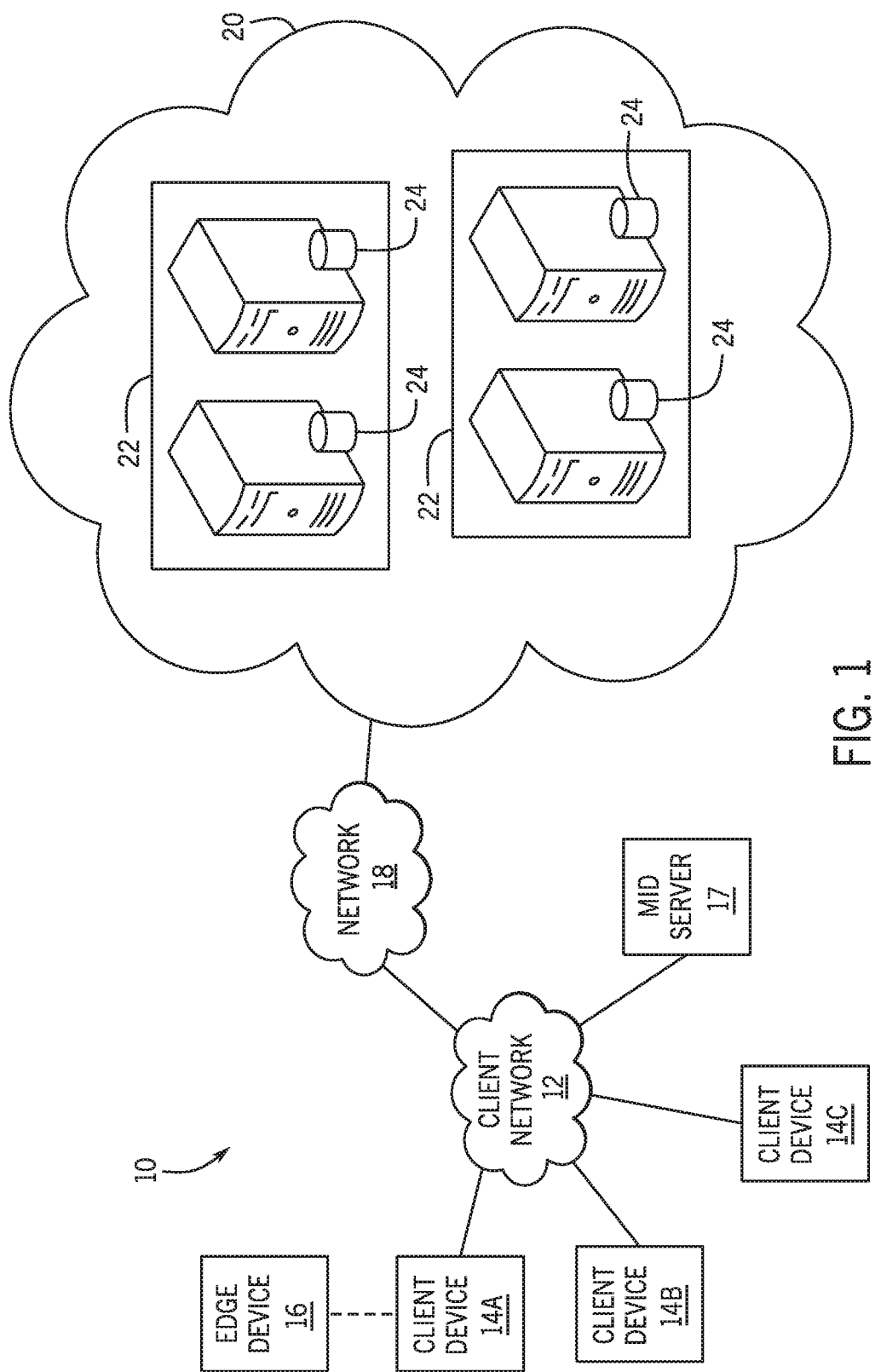
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to a single electronic computing device that includes, but is not limited to a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present disclosure is directed to a system, components of the system, and methods for executing server-side scripts using a console session on a client device. A cloud-based platform (or a server of the cloud-based platform) may receive an indication that the console session is instantiated from the client device. In response to receiving the indication, the cloud-based platform may generate a thread having a unique identifier. The thread may correspond to a background job (e.g., a job that is executed on the server-side but instructed to be executed on the client-side) performed on the cloud-based platform. The cloud-based platform may execute threads mutually exclusively (e.g., in parallel, but such that each thread has its own context). The cloud-based platform may determine whether an input queue associated with the unique identifier has an input. If so, the cloud-based platform evaluates the input and writes a resulting output to an output queue associated with the unique identifier. The client device may then print the input and the resulting output to a console user interface associated with the console session, and remove the input from the input queue. In some embodiments, if the input queue stores no inputs for a threshold period of time (e.g., a timeout period), the cloud-based platform may end the thread.

With the preceding in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 20, network operators may choose to configure the data centers 22 using a variety of computing infrastructures. In one embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
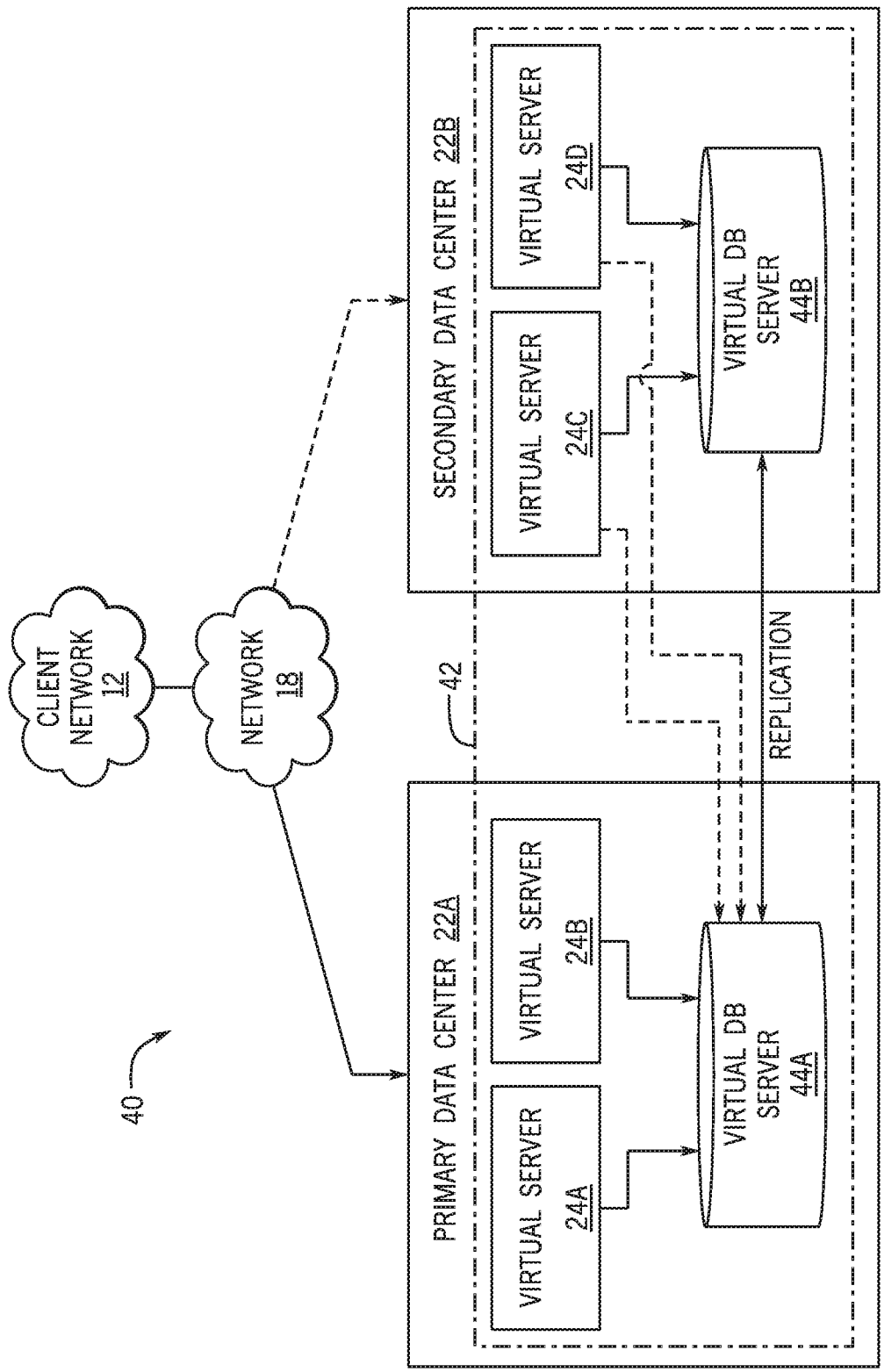
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances but are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center 22A that includes a primary pair of virtual servers 24A and 24B and the primary virtual database server 44A associated with the client instance 42, and data center 22B acts as a secondary data center 22B to back up the primary data center 22A for the client instance 42. To back up the primary data center 22A for the client instance 42, the secondary data center 22 includes a secondary pair of virtual servers 24C and 24D and a secondary virtual database server 44B. The primary virtual database server 44A is able to replicate data to the secondary virtual database server 44B.

As shown in FIG. 2, the primary virtual database server 44A may replicate data to the secondary virtual database server 44B using, e.g., a Master-Master MySQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual server into a single virtual server. Using FIG. 2 as an example, the virtual servers 24A-D and virtual database servers 44A and 44B may be combined into a single virtual server. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
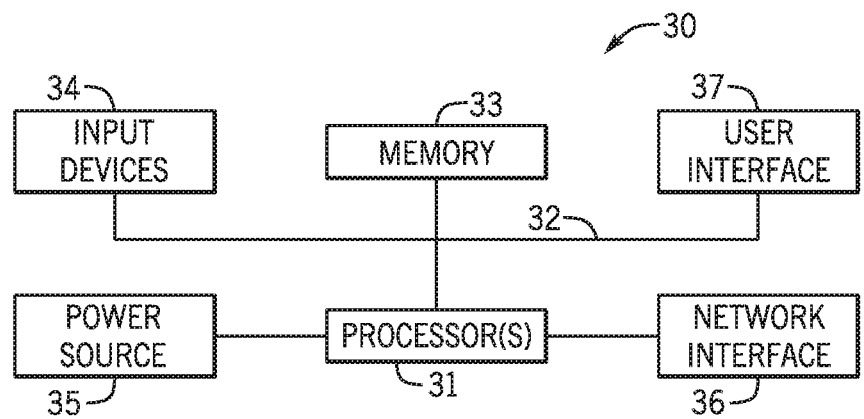
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 30 and their potential interconnections or communication paths, such as along one or more busses. As illustrated, the computing system 30 may include various hardware components such as, but not limited to, one or more processors 31, one or more busses 84, memory 33, input devices 34, a power source 35, a network interface 36, a user interface 37, and/or other computer components useful in performing the functions described herein.

The one or more processors 31 may include one or more microprocessors capable of performing instructions stored in the memory 33. Additionally or alternatively, the one or more processors 31 may include application-specific integrated circuits (ASICs), field-programmable gate arrays (FPGAs), and/or other devices designed to perform some or all of the functions discussed herein without calling instructions from the memory 33.

With respect to other components, the one or more busses 84 includes suitable electrical channels to provide data and/or power between the various components of the computing system 30. The memory 33 may include any tangible, non-transitory, and computer-readable storage media. Although shown as a single block in FIG. 1, the memory 33 can be implemented using multiple physical units of the same or different types in one or more physical locations. The input devices 34 correspond to structures to input data and/or commands to the one or more processor 31. For example, the input devices 34 may include a mouse, touchpad, touchscreen, keyboard and the like. The power source 35 can be any suitable source for power of the various components of the computing device 80, such as line power and/or a battery source. The network interface 36 includes one or more transceivers capable of communicating with other devices over one or more networks (e.g., a communication channel). The network interface 36 may provide a wired network interface or a wireless network interface. A user interface 37 may include a display that is configured to display text or images transferred to it from the one or more processors 31. In addition and/or alternative to the display, the user interface 37 may include other devices for interfacing with a user, such as lights (e.g., LEDs), speakers, and the like.

The present disclosure includes embodiments of the cloud-based platform 20 (or one or more virtual servers 24A-D) having functionality that enables the client instance 42 to receive an indication that a console session is instantiated (e.g., from the client device 14A). In response to receiving the indication, the client instance 42 may generate a thread having a unique identifier. The thread may correspond to a background job (e.g., a job that is executed on the server-side but instructed to be executed on the client-side) performed on the cloud-based platform 20. The cloud-based platform 20 may execute threads mutually exclusively (e.g., in parallel, but such that each thread has its own context). The cloud-based platform 20 may determine whether an input queue associated with the unique identifier has an input. If so, the cloud-based platform 20 evaluates the input and writes a resulting output to an output queue associated with the unique identifier. The cloud-based platform 20 may then print the input and the resulting output to a console user interface associated with the console session, and remove the input from the input queue. In some embodiments, if the input queue stores no inputs for a threshold period of time (e.g., a timeout period or other suitable time limitation), the cloud-based platform 20 may end the thread.

As discussed below, the disclosed embodiments enable multiple developers to use multiple mutually exclusive console sessions to execute server-side scripts in parallel, instead of only allowing one developer at a time to execute server-side scripts. The console sessions may be supported by a console application executed on the platform 20, and the console application may be a recursively interpreted script executor for the platform 20. Each console session may execute lines of computer code or scripts line-by-line, such that an output of each input line of computer code or script is provided after the respective input line or script is entered, avoiding having to enter and compile an entire block of computer code to review an output. These lines of computer code or scripts may be background scripts, such that they are executed on the server-side (e.g., by the platform 20), though sent from the client device 14A. In this manner, a developer may advantageously view each output in real-time, instead of after, for example, an entire block of computer code has been compiled and executed.

The platform 20 may enable multiple console sessions to run concurrently, in parallel, and mutually exclusively, such that each console session may maintain its individual context. That is, each console session may perform actions and set, change, or delete values, and, for that console session, those actions and values may be maintained. For example, if a first console session sets a variable X to a value of 3, and a second console session later sets the variable X to a value of 5, if the first console session then accesses the variable X, it may retain the value of 3 because the first console session's context is maintained independently from the second console session. In this manner, multiple console sessions may be run from multiple client devices 14A-C concurrently, without undesirably affecting one another.

Figure 4:
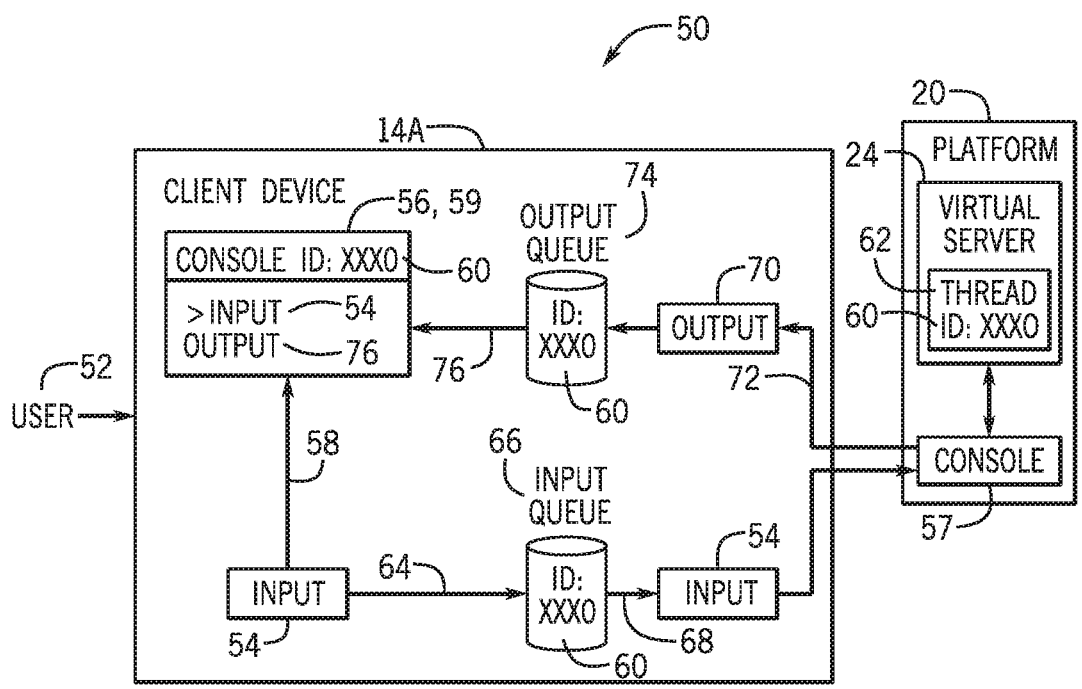
FIG. 4 is a high-level diagram of a system for providing multiple mutually exclusive console sessions to execute server-side scripts in parallel, in accordance with embodiments of the present disclosure.

With the foregoing in mind, FIG. 4 is a high-level diagram of a system 50 for providing multiple mutually exclusive console sessions to execute server-side scripts in parallel, in accordance with embodiments of the present disclosure. The system 50 includes the client device 14A which may be operated by a user or developer 52. The user 52 may enter an input 54. The input 54 may be an input script or line of computer code), such as in JavaScript format, to be executed on the cloud-based platform 20. In some embodiments, the input script 54 may be executed on a virtual server 24A of the platform 20 (e.g., as a background script).

After entering the input 54, the input 54 may be displayed 58 on a console user interface 56 of the client device 14A, which may be referred to in the present disclosure as the console UI 56. In particular, the user may have opened or executed the console UI 56 on the client device 14A, and entered the input 54 in the console UI 56. The input 54 may be read as a string. The console UI 56 may supported by a console application 57 (the "console" 57) running on the platform 20. In particular, by executing the console UI 56, a console session 59 may be generated by the console 57. The console 57 be a recursively executed script executor for the platform 20, be provided as an interactive shell with a running context, and, as such, be used as an exploratory programming console.

The console 57 may enable line-by-line script execution capability for backend computer code in the platform 20. That is, the user 52 may run a single or multiple lines of script 54, review the result or output 70, update the line or lines of script 54, and/or proceed with execution of a next line or lines of script 54. Advantageously, the user 52 may modify his or her script 54 and check the output 70 of the updated script 54 in one place (e.g., the console UI 56). As such, the tedious process of committing the script 54 to a database before testing a minor or major modification may be skipped or eliminated altogether. The console 57 may thus be particularly useful in a number of applications that would be performed more efficiently without having to commit, compile, and execute an entire block computer code, such as exploratory programming, learning platform features, debugging, prototyping, testing, and the like. The console UI 56 may then display 58 the input 54 that has already been executed to enable the user 52, for example, to see a history of the inputs 54 entered and, in some embodiments, select the displayed input 54 to have the platform 20 re-execute the input 54.

Upon executing the console UI 56, the console 57 may associate the console UI 56 and corresponding console session 59 with a unique identifier 60 (e.g., an identification number or other suitable form of session identifier). In particular, the console 57 may associate the identifier 60 with a thread 62 or background job executed by the platform 20 (e.g., via the virtual server 24A) in response to the client device 14A opening a console session 59. The identifier 60 may be unique with respect to identifiers 60 of other console sessions 59 executing on the same client device 14A, as well as console sessions 59 being executed on other client devices (e.g., 14B, 14C). As such, each instantiated console session 59 that has a thread 62 being executed by the platform 20 may have an identifier 60 that is different from the identifiers 60 of the other console sessions 59 having threads 60 being executed by the platform 20.

Additionally, after entering the input 54, the client device 14A may store 64 the input 54 in an input queue or table 66 (e.g., as a string) associated with the unique identifier 60. If the client device 14A is running multiple console sessions 59 having multiple unique identifiers 60, then the client device 14A may have multiple input queues 66 associated with the unique identifiers 60, and store 64 inputs 54 from each console session 59 in a respective input queue 66. The input queue 66 may be any suitable type of queue, such as a first-in, first-out (FIFO) queue.

The input 54 may be sent 68 from the input queue 66 to the platform 20 (and the virtual server 24A). For example, the input 54 may sent 68 as a string to the platform 20, which interprets the string input 54 using an evaluation function. In the case of JavaScript, the string input 54 may be interpreted using an "eval" function. The platform 20 may execute or evaluate the interpreted input script 54 (e.g., on the virtual server 24A) via the thread 62. As such, the platform 20 may generate a resulting output 70 via the thread 62 based on executing the input script 54.

The output 70 may be in the form of, for example, a value of expression, an error message, or the like. The output 70 may be sent 72 to an output queue or table 74 of the client device 14A associated with the unique identifier 60. As with the input queue 66, if the client device 14A is running multiple console sessions 59 having multiple unique identifiers 60, then the client device may have multiple output queues 74 associated with the unique identifiers 60, and store the outputs 70 from the threads 62 having the unique identifier 60 in a respective output queue 74. The output queue 74 may be any suitable type of queue, such as a first-in, first-out (FIFO) queue. The output 76 may be sent to the console UI 56 and displayed on the console UI 56, e.g., for viewing by the user 52. As such, the output 76 may be an evaluated result of the string input 54. By associating the unique identifier 60 corresponding to the running thread 62 in the platform 20 with the console session 59, the input queue 66, and the output queue 74, the system 50 may provide multiple mutually exclusive console sessions 59 to execute server-side scripts 54 in parallel.

Figure 5:
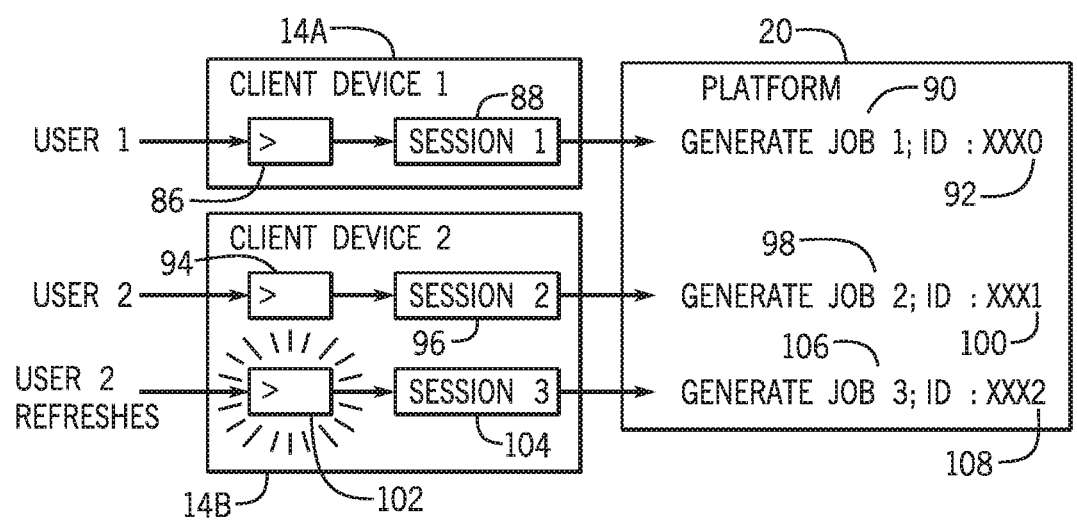
FIG. 5 is a high level diagram of the configuration management database (CMDB) platform of FIG. 1 managing multiple mutually exclusive console sessions that execute server-side scripts in parallel, in accordance with embodiments of the present disclosure.

FIG. 5 is a high level diagram of the platform 20 managing multiple mutually exclusive console sessions that execute server-side scripts in parallel, in accordance with embodiments of the present disclosure. In particular, a first user, User 1, may open a console UI 86 on his or her client device 14A. Opening the console UI 86 may instantiate a console session 88, Session 1, at the client device 14A and/or the platform 20 (e.g., at the virtual server 24A). As a result, the platform 20 may instantiate a corresponding thread of background job 90, Job 1, having a unique identifier 92, XXX0. The unique identifier 92, XXX0, may be associated with not only the background job 90, Job 1, but also the console session 88, Session 1, and respective input and output queues 66, 74 in the client device 14A. The background job 90, Job 1, may periodically read the respective input queue 66 for input scripts 54 (e.g., JavaScript expressions) that are stored with the unique identifier 92, XXX0, evaluate the input scripts 54, and store the result (e.g., a returned value of the JavaScript expression, thrown error message, or the like) in the respective output queue 74 with the same unique identifier 92, XXX0. The console session 88, Session 1, may constantly poll or monitor the respective output queue 74 for new output messages 76 and print an output message 76 to the console UI 56 when it receives a new output message 76. Although examples of the unique identifiers in the present disclosure provide four integer digits, it should be understood that any form of unique identifier may be used (e.g., binary, floating point, eight digits, twelve bits, and the like).

A second user, User 2, may also open a console UI 94 on his or her client device 14B. Opening the console UI 94 may instantiate a console session 96, Session 2, at the client device 14B and/or the platform 20 (e.g., at the virtual server 24A). As a result, the platform 20 may instantiate a corresponding thread of background job 98, Job 2, having a unique identifier 100, XXX1. The unique identifier 100, XXX1, may be associated with not only the background job 98, Job 2, but also the console session 96, Session 2, and respective input and output queues 66, 74 in the client device 14B. The background job 98, Job 2, may periodically read the respective input queue 66 for input scripts 54 (e.g., JavaScript expressions) that are stored with the unique identifier 100, XXX1, evaluate the input scripts 54, and store the result (e.g., a returned value of the JavaScript expression, thrown error message, or the like) in the respective output queue 74 with the same unique identifier 100, XXX1. The console session 88, Session 2, may constantly poll or monitor the respective output queue 74 for new output messages 76 and print an output message 76 to the console UI 56 when it receives a new output message 76.

Opening an additional console UI or refreshing a currently running console UI running on a client device may instantiate a new thread or background job having a new unique identifier. For example, as illustrated, the second user, User 2, may refresh the console UI 94 on his or her client device 14B. As a result, a new console session 104, Session 3, may be instantiated at the client device 14B and/or the platform 20 (e.g., at the virtual server 24A). The platform 20 may also instantiate a corresponding thread of background job 106, Job 3, having a unique identifier 108, XXX2. The previous console session 96, Session 2, may lose its context, as the new console session 104, Session 3, may be used as a fresh console session. In this manner, the platform 20 may managing multiple mutually exclusive console sessions that execute server-side scripts in parallel.

Figure 6:
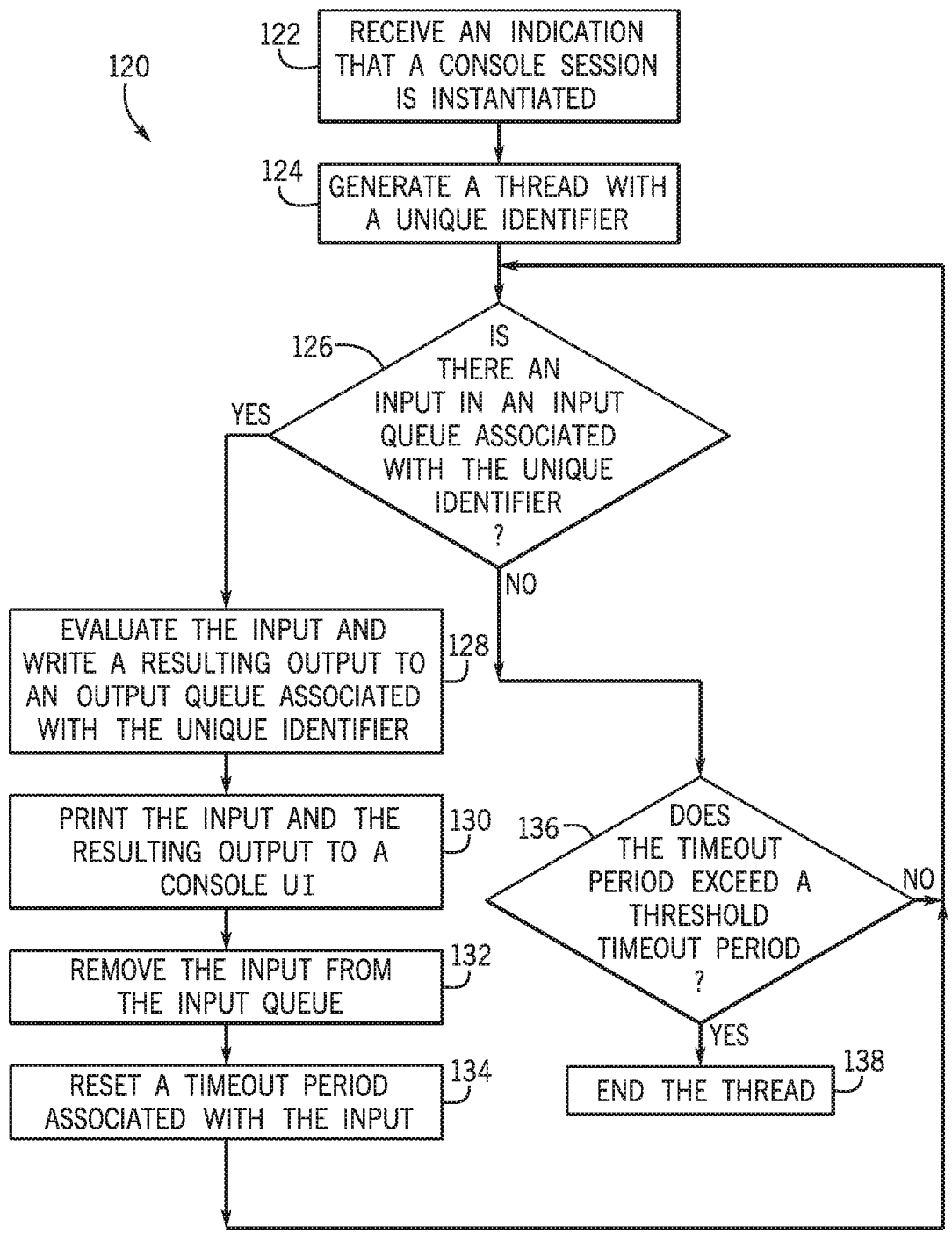
FIG. 6 is a flowchart of a process for providing multiple mutually exclusive console sessions to execute server-side scripts in parallel, in accordance with embodiments of the present disclosure.

FIG. 6 is a flowchart of a process 120 for providing multiple mutually exclusive console sessions 59 to execute server-side scripts in parallel, in accordance with embodiments of the present disclosure. The process 120 may be in the form of an application that includes instructions that are executed by at least one suitable processor of a computer system as part of the platform 20, the virtual server 24, the client instance 42, the client device (e.g., 14A), and the like. The illustrated process 120 is merely provided as an example, and in other embodiments, certain illustrated steps of the process 120 may be performed in other orders, skipped, or repeated, in accordance with the present disclosure.

As illustrated, in process block 122, the platform 20 may receive an indication that a console session 59 is instantiated. For example, as illustrated in FIG. 4, the user 52 may open the console UI 56, which may instantiate the console session 59 on the client device 14A. An indication that the console session 59 was instantiated may be sent to the platform 20.

The platform 20 may then, in process block 124, generate a thread 62 with a unique identifier 60. For example, as illustrated in FIG. 4, in response to the console session 59 being instantiated, the platform 20 (e.g., via the virtual server 24) generates the thread 62 having the unique identified 60 of XXX0.

The platform 20 may, in decision block 126, determine whether there is an input 54 in an input queue 66 associated with the unique identifier 60. If so, the platform 20 may, in process block 128, evaluate the input 54 and write a resulting output 76 to an output queue 74 associated with the unique identifier 60. For example, as illustrated in FIG. 4, the client device 14A includes the input queue 66 associated with the unique identifier 60 of XXX0. When the user 52 enters the input 54, the input 54 is sent 64 to the input queue 66. The platform 20 may determine that the input 54 is in the input queue 66. As illustrated, the platform 20 includes the output queue 74 associated with the unique identifier 60 of XXX0. As such, the platform 20 evaluates the input 54 and writes the resulting output 76 to the output queue 74.

In process block 130, the client device 14A may then print the input 54 and the resulting output 76 to a console UI 56. In some embodiments, as discussed further in FIG. 7 below, the console UI 56 may include a history area illustrating previous inputs 54 that the user 52 has entered for convenience and reference. As such, the client device 14A may print the input 54 to the history area of the console UI 56. Additionally, the client device 14A may print the output 76 to the console UI 56 to enable the user 52 to see the result of the input 54 to, for example, enable exploratory programming, learning platform features, debugging, prototyping, testing, and the like.

In process block 132, the client device 14A may remove the input 54 from the input queue 66 as it has been executed by the platform 20 via the thread 62. In process block 134, the client device 14A may also reset a timeout period associated with the input 54. In particular, the timeout period may be a period of time that beings when the input 54 is entered by the user 52 and/or inserted into the input queue 66. The platform 20 may then return to decision block 126, and repeat for any inputs 54 stored in the input queue 66.

If there is no input 56 in the input queue 66 per decision block 126, the platform 20 may determine whether the timeout period exceeds a threshold timeout period. The threshold timeout period may be any suitable amount of time (e.g., at least five minutes, at least ten minutes, at least thirty minutes, and the like) that the platform 20 ends the thread 62 due to inactivity (e.g., no input 56). This may save system resources, as non-terminated threads 62/console sessions 59 which are unused may stay alive and keep using such resources. In process block 138, if the timeout period exceeds the threshold timeout period, then the platform 20 ends the thread 62. If the timeout period does not exceed the threshold timeout period, the platform 20 may return to decision block 126, and repeat for any inputs 54 stored in the input queue 66. In this manner, the process 120 may provide multiple mutually exclusive console sessions 59 to execute server-side scripts 54 in parallel.

Figure 7:
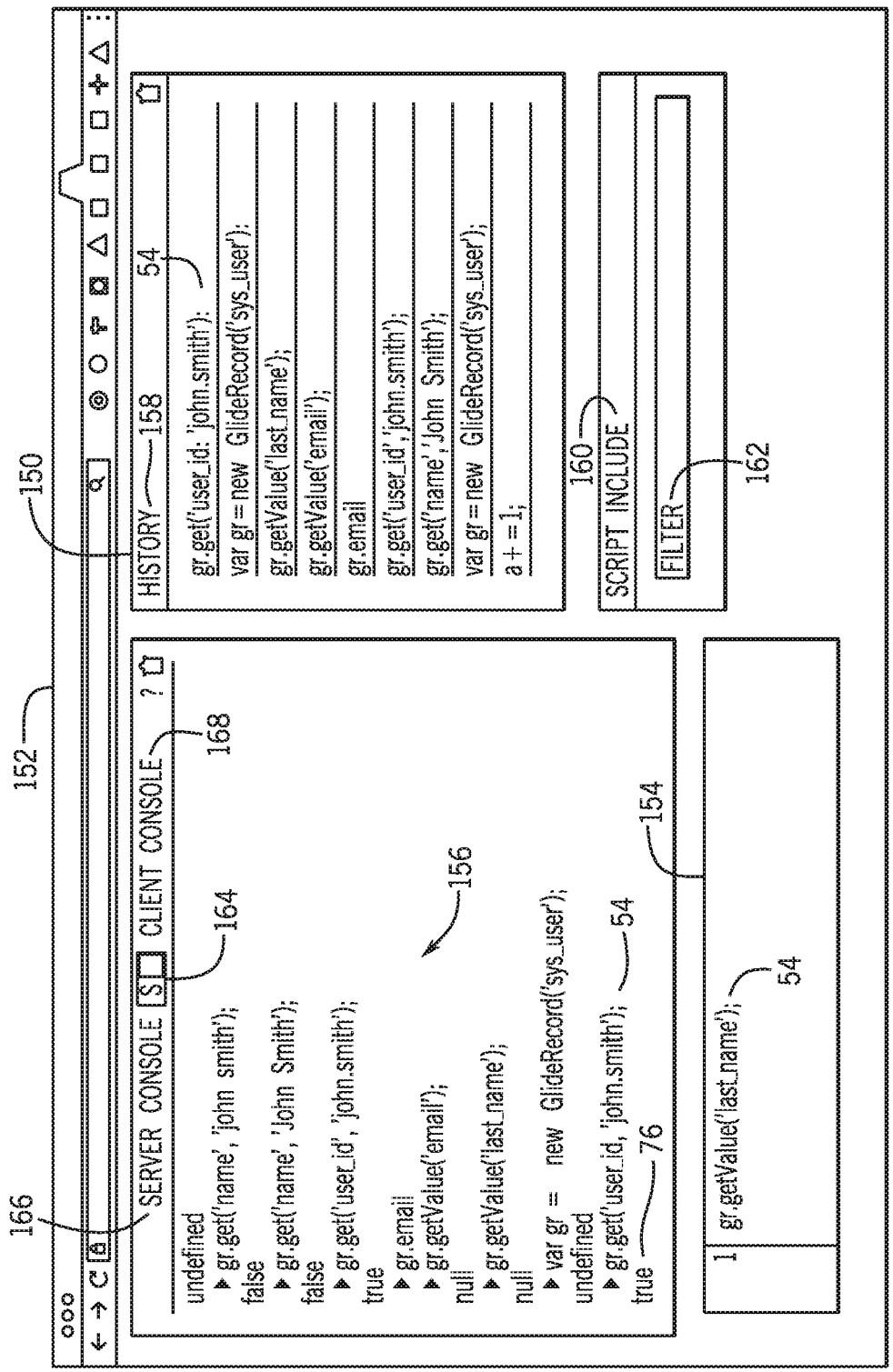
FIG. 7 is an example console user interface of FIG. 4 that may be displayed on a client device to facilitate providing multiple mutually exclusive console sessions to execute server-side scripts in parallel, in accordance with embodiments of the present disclosure.

FIG. 7 is an example console UI 150 that may be displayed on a client device (e.g., 14A), in accordance with embodiments of the present disclosure. More specifically, the console UI 150 may be displayed within a web browser 152 operating on the client device 14A. That is, the platform 20 may be connected to the client device 14A via the network 18 to provide the console UI 150 to network applications executing within the client instance 42. The client instance 42 may include cloud resources and server instances similar to those explained with respect to FIG. 2. Cloud provider infrastructures generally support multiple end-user devices, such as client device 14A, concurrently, wherein each end-user device may be in communication with the single client instance 42. Also, cloud provider infrastructures may be configured to support any number of client instances, such as the client instance 42, concurrently, with each of the client instances 42 in communication with one or more end-user devices. As mentioned above, an end-user may also interface with the client instance 42 using an application that is executed within the web browser 152.

The console UI 150 includes an input area 154 that enables entry of inputs 54. For example, as shown in FIG. 7, the user 52 has entered the input 54: gr.getValue('last_name'). After entry, the console UI 150 displays the input 54 in an output area 156 that displays the input 54 and the resulting output 76. For example, the resulting output 76 from the input 54 (gr.getValue('last_name')) is: true. The console UI 150 may also include a history area 158 that displays each entered input 54. The console UI 150 may enable the user 52 to select (e.g., via a mousing device, or keyboard) the input 54 in the history area 158 to re-enter the input 54 in the input area 154. In some embodiments, the history area 158 may include a previous inputs 54 using a lookup function that searches the previous inputs 54 for, for example, keywords. When generating a block of computer code to be compiled, the user 52 may conveniently select the input 54 from the history area 158 rather than re-type the input 54.

The console UI 150 may also include a pre-defined script area 160 that enables selection of scripts available from the platform 20, the virtual server 24, the client instance 42, the client device 14A, and the like. In particular, metadata may be generated from the available scripts, and the console UI 150 may enable quick searching of the metadata for use in, for example, script development, debugging, and the like. The metadata may be searched via navigation using a mousing device in the pre-defined script area 160, keyboard entry in a text box 162, and the like. For example, the user 52 may enter a search string in the text box 162. The console UI 150 may then provide search results in the form of pre-defined scripts in the pre-defined script area 160 based on class names defined in the pre-defined scripts, function names pre-defined script area 160, and the like, that approximately match the search string. The user 52 may then click, using a mousing device, a search result to insert the pre-defined script in the input area 154. As with the input area 154, when generating a block of computer code to be compiled, the user 52 may conveniently select a pre-defined script from the pre-defined script area 160 rather than tediously typing out the pre-defined script.

The console UI 150 may also include a toggle 164 that enables switching from a server console view 166 (e.g., the current view provided in FIG. 7) of input scripts 54 performed on a server application and a client console or web browser view 168 of the input scripts 54 performed on the server application. In this manner, the user 52 may view the server application, in real-time, both on the front-end (e.g., browser end) and the back-end (e.g., server end).

The technical effects of the present disclosure include providing multiple mutually exclusive console sessions to execute server-side scripts in parallel. In particular, the present disclosure includes a cloud-based platform (or a server of the cloud-based platform) receiving an indication that a console session is instantiated from, for example, a client device. In response to receiving the indication, the cloud-based platform may generate a thread having a unique identifier. The thread may correspond to a background job performed on the cloud-based platform. The cloud-based platform may execute threads mutually exclusively (e.g., in parallel, but such that each thread has its own context). The cloud-based platform may determine whether an input queue associated with the unique identifier has an input. If so, the cloud-based platform evaluates the input and writes a resulting output to an output queue associated with the unique identifier. The client device may then print the input and the resulting output to a console user interface associated with the console session, and remove the input from the input queue. In some embodiments, if the input queue stores no inputs for a threshold period of time (e.g., a timeout period), the cloud-based platform may end the thread.

Additionally, the console user interface may enable selection of the printed inputs to have the server quickly reevaluate an input. Each console user interface may also enable usage of pre-defined scripts to quickly generate a block of code desired by a developer. In some embodiments, the console user interface may enable searching of the pre-defined scripts by identifying search terms in metadata of the pre-defined scripts. As such, the developer may use the console to conveniently generate a block of desired computer code.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
an information technology platform configured to enable a plurality of threads to be executed mutually exclusively;
a console configured to interpret a thread of the plurality of threads, wherein the console associates a console user interface and a corresponding console session with a unique identifier, wherein the console associates the unique identifier with the thread of the plurality of threads, wherein the information technology platform is configured to execute instructions that cause the information technology platform to perform operations comprising:
detecting an access to the console;
generating the thread with the unique identifier based at least on the access detected, wherein the thread corresponds to a background job performed on the information technology platform;
enabling the thread to read one or more inputs from an input queue associated with the unique identifier;
enabling the thread to write one or more outputs into an output queue associated with the unique identifier;
determining whether a time limitation is met in response to the thread reading the one or more inputs, the thread writing the one or more outputs, or both; and
terminating the background job based at least on the time limitation being met.

2. The system of claim 1, wherein the operations comprise displaying the one or more inputs in the console user interface supported by the console after the thread reads the one or more inputs.

3. The system of claim 2, wherein the operations comprise enabling the thread to reread the one or more inputs from the input queue in response to receiving an indication of selecting the one or more inputs in the console user interface.

4. The system of claim 1, wherein the operations comprise displaying the one or more outputs in the console user interface supported by the console after the thread writes the one or more outputs.

5. The system of claim 1, wherein the one or more inputs comprise a plurality of inputs, wherein the thread is configured to read a first input of the plurality of inputs and write a corresponding output of the one or more outputs prior to reading a second input of the plurality of inputs.

6. A system, comprising:
a cloud-based platform configured to execute a server application, execute a plurality of threads mutually exclusively, and enable a plurality of console sessions operating on a plurality of computing devices to execute a plurality of server-side scripts line-by-line on the server application, wherein the plurality of console sessions are configured to operate mutually exclusively on the plurality of computing devices, wherein each console session of the plurality of console sessions comprises a unique identifier associated with a respective thread of the plurality of threads; and
a computing device of the plurality of computing devices, wherein the computing device is configured to:
open a console session of the plurality of console sessions, wherein the console session is configured to receive one or more server-side scripts of the plurality of server-side scripts, wherein the console session is associated with a console user interface, wherein the console user interface comprises:
an input area configured to receive the one or more server-side scripts to be executed by the cloud-based platform; and
an output area configured to display one or more server-side outputs resulting from the cloud-based platform executing the one or more server-side scripts;
receive a server-side script of the one or more server-side scripts in the input area;
instruct the cloud-based platform to execute the server-side script;
receive a server-side output of a plurality of server-side outputs from the cloud-based platform resulting from executing the server-side script; and
display the server-side output from the cloud-based platform in the output area.

7. The system of claim 6, wherein the computing device is configured to open a web browser, wherein the console user interface is displayed in the web browser.

8. The system of claim 6, wherein the console user interface comprises a history area configured to display a history of the one or more server-side scripts executed by the cloud-based platform in the history area.

9. The system of claim 6, wherein the console user interface comprises a toggle configured to provide a browser view of the server application.

10. The system of claim 6, wherein the server application comprises a sequence of instructions that are pre-compiled.

11. The system of claim 10, wherein the computing device is configured to receive an indication execute a first instruction of the sequence of instructions and instruct the cloud-based platform to execute the first instruction.

12. The system of claim 6, wherein the console user interface comprises a pre-defined script area configured to display a plurality of pre-defined scripts and display functions available for each pre-defined script of the plurality of pre-defined scripts.

13. The system of claim 12, wherein the computing device is configured to instruct cloud-based platform to execute a pre-defined script of the plurality of pre-defined scripts in response to receiving a selection of the pre-defined script in the pre-defined script area.

14. The system of claim 12, wherein the pre-defined script area comprises metadata for each pre-defined script to enable searching among the plurality of pre-defined scripts.

15. The computing device of claim 12, wherein a pre-defined script of the plurality of pre-defined scripts is configured to define a function or class.

16. The computing device of claim 12, wherein a pre-defined script of the plurality of pre-defined scripts is configured to extend an existing class.

17. The computing device of claim 12, wherein a pre-defined script of the plurality of pre-defined scripts is classless.

18. A method comprising:
receiving an indication that a console is instantiated, wherein the console associates a console user interface and a corresponding console session with a unique identifier;
generating a thread of a plurality of threads with the unique identifier in response to receiving the indication, wherein the thread corresponds to a background job performed on a cloud-based platform, wherein the cloud-based platform is configured to execute the plurality of threads mutually exclusively;
determining whether an input queue associated with the unique identifier has an input;
evaluating the input and writing a resulting output to an output queue associated with the unique identifier in response to determining that the input queue has the input;
printing the input and the resulting output to the console user interface supported by the console; and
removing the input from the input queue.

19. The method of claim 18, comprising, after evaluating the input:
enabling the thread to read a second input from the input queue based at least on the unique identifier;
evaluating the second input and writing a second resulting output the output queue associated with the unique identifier;
printing the second input and the second resulting output to the console user interface; and
removing the second input from the input queue.

20. The method of claim 18, comprising:
determining whether a time period starting from when the thread read the input exceeds a threshold time period; and
terminating the background job in response to determining that the time period exceeds the threshold time period.

* * * * *